(12) United States Patent
Caughran et al.

(10) Patent No.: US 6,381,604 B1
(45) Date of Patent: Apr. 30, 2002

(54) TEST INFORMATION MANAGEMENT SYSTEM

(75) Inventors: Michael J. Caughran, Kamiah, ID (US); Steve C. Weber, Milpitas; Dennis E. Caughran, Prunedale, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/364,710

(22) Filed: Jul. 30, 1999

(51) Int. Cl.[7] .............................................. G06F 17/30
(52) U.S. Cl. .......................................... 707/10; 714/31
(58) Field of Search ................................. 707/10; 714/4, 714/121, 31, 38

(56) References Cited

U.S. PATENT DOCUMENTS

| | | | | |
|---|---|---|---|---|
| 5,021,997 A | * | 6/1991 | Archie et al. | 714/31 |
| 5,036,479 A | * | 7/1991 | Prednis et al. | 702/121 |
| 5,659,547 A | * | 8/1997 | Scarr et al. | 714/4 |
| 5,751,941 A | * | 5/1998 | Hinds et al. | 714/38 |

\* cited by examiner

*Primary Examiner*—Sanjiv Shah
(74) *Attorney, Agent, or Firm*—Marger Johnson & McCollom, P.C.

(57) ABSTRACT

A centralized test information management system and method for its operation are disclosed. The system is implemented on a server that communicates with remote users using a web-based interface. The interface is bifurcated into a tester's interface and a query interface.

The tester's interface allows testers developing products to use a standardized set of web-based templates to create test plans and tests, enter test results, and associate test plans, tests, and test results. Data entered by the testers is stored in a database.

The query interface allows remote users, including testers, their managers, and program managers to obtain an instantaneous snapshot of testing progress by entering queries on a web-based search form. The queries are used to retrieve test data from the database, and are presented to the remote user in a web-browser viewable standardized format. The user can then view more or less detail by selecting hyperlinks on the displayed forms, the hyperlinks linking the user to other levels of data associated with the currently displayed test data.

In a preferred embodiment, test data is assignable to one of several levels of visibility. Thus, for instance, a specific test may be viewable by the tester only, by the test group, the engineering group, company-wide, or unlimited. When access is set to company-wide or unlimited, the test results are available to aid account representatives and customers in troubleshooting or setting up similar equipment.

25 Claims, 17 Drawing Sheets

| Test Information Management System–Microsoft Internet Explorer | _ □ X |

File  Edit  View  Go  Favorites  Help

Back  Forward  Stop  Refresh  Home  Search  Favorites  History  Channel  Fullscreen  Mail  Print Address: http://wwwin-.cisco.com/

Links  Portfolio  Comics  ECS Support  Directory  Mailer Page  Open Actions  ESPN.com  TMS  Search  Detects

| | |
|---|---|
| HELP | Tester: mmanzana  Test Type: System  Condition: Changes Introduced  Topology: Full Mesh |
| Tests Query | 80B |
| Technical notes Query | Client-Server Traffic: |
| Problems Query | FTP scripts running on WinNT clients which transfer and verify multiple files and execute VT commands to NT (IP) servers. Number of clients and server given in diagrams |
| Test Plan | |
| FeedBack | |
| Tester's Interface | |
| Admin | |

Other Parameters:
1) Background Traffic (priority 5) (2) TOS Traffic (priorities 1-5) (3) 83k routes in routing table (4) 354/BGP updates minute (5) 88 IBGP peers [ISP3BB2, the rest have 8 IBGP peers]

Error/Faults introduced into the test:
ATM switch (LSP3BPX1) is power cycled. Powered off time is 2 mins.   88

Test Tools   Technical Notes

DDTs' Submitted:
CSCdk38985 —— 92

Traces                    Problems

Projects Associated with this Test:
12.0 FCS
ATM-IP Cos Mapping
ISP Profile

Platform Details:

| | Software Version: | Image Name: |
|---|---|---|
| (ISP3BB1) Cisco 7513 | 11.1(7760)XX[rolsen181] | RSP-PV-M |
| (ISP3BB2) Cisco 7513 | 12.0(0.18) | RSP-PV-M |
| (ISP3BB3) Cisco 7513 | 12.0(0.19) | RSP-PV-M |
| (ISP3BB4) Cisco 7513 | 12.0(0.19) | RSP-PV-M |
| (ISP3BB5) Cisco 7513 | 12.0(0.19) | RSP-PV-M |
| (ISP3BB6) Cisco 7513 | 11.1(7760)XX[rolsen181] | RSP-PV-M |
| (ISP3BB7) Cisco 7513 | 11.1(7760)XX[rolsen181] | RSP-PV-M |
| (ISP3BPX1) Cisco BPX | 8.4.1B | |
| (ISP3BPX2) Cisco BPX | 8.4.1B | |

Noteworthy Features Tested:
ATM-Classic IP ( RFC1577)
ATM-IP Cos Mapping
BGP
IP

Internet zone

FIG6B

CSCdk38985

Internally found severe defect: Duplicate (D)

ATM Lite PA stops receiving inbound traffic

Full text of defect
Attachments: Description Debug BB3 Debug BB6 Dup of CSCdk27922
CARE Tickets: *None*

| HELP |
|---|
| Tests Query |
| Technical notes Query |
| Problems Query |
| Test Plan |
| FeedBack |
| Tester's Interface |
| Admin |

| What | | How Bad | | Who | | Versions | |
|---|---|---|---|---|---|---|---|
| Status | Duplicate(D) | Priority | N/A | De-Manager | dkhurana | Version | 11.1 (20.02) CC |
| Found | sys-test | Severity | severe (2) | DTPT-Manager | | | |
| Project | CSC.sys | DE-priority | 3 | Engineer | sju | To be fixed in | 11.1 (20.02) CC |
| Product | rsp | | | Submitted by | mmanzana | | |
| Component | pas-atm | | | Assigned by | dkhurana | Apply to | |
| Software | rsp | | | Customer Engineer | | Integrated in | |
| Obs-Software | rsp-pv-mz | | | Code reviewed by | | | |
| Hardware | all | | | | | | |
| Attribute | CEN | | | | | | |
| Duplicate of | CSCdk27922 | | | | | | |

History

| | | | |
|---|---|---|---|
| xddts | 980831 | 115418 | Submitted to CSC.sys by mmanzana@anthill |
| xddts | 980831 | 115631 | DE-manager: IOS Default set to "dkhurana" automatically |
| xddts | 980831 | 115726 | Attribute " "__>"CEN" by mmanzana |
| xddts | 980831 | 115816 | Enclosure "Description" added by mmanzana |
| xddts | 980831 | 115850 | Enclosure "Debug_BB3" added by mmanzana |
| xddts | 980831 | 115924 | Enclosure "Debug_BB6" added by mmanzana |
| xddts | 980916 | 171135 | N -> W by dkhurana |
| xddts | 980916 | 171147 | Engineer: Assigned to "sju" by dkhurana |
| xddts | 980916 | 171217 | W -> A by dkhurana |
| bugs | 980922 | 153837 | A -> D (CSCdk27922) by sju |
| batchbug | 981218 | 074210 | Enclosure "Dup of CSCdk27922" modified by ddts |

TEST INFORMATION MANAGEMENT SYSTEM

FIELD OF THE INVENTION

This invention pertains to product testing, and particularly to methods and systems for managing product testing programs and product testing program information.

BACKGROUND OF THE INVENTION

Many products require extensive testing during product development. For example, computer network hardware and software must be tested under real or simulated network conditions for compatibility with legacy hardware and software, for proper operation under a variety of network load conditions, and for proper behavior in response to a variety of network fault conditions. In order to execute these and other tests for a product, an engineer typically develops a test plan, designs a variety of tests to meet the objectives of the plan, and executes these tests.

When a new product is to be tested, a test engineer manually produces a test plan document, e.g., by writing the document using a computer-based text/document editor. For each test in the plan, the engineer executes the test one or more times and records the results. Recording generally consists of entering results in a lab notebook, making notations in a printed copy of the test plan, copying screen output to files, etc. Once the testing is complete, the engineer manually produces a test report that summarizes the test results in the context of the test plan. The production of this report is typically time-consuming, and is considered to be drudgery by many test engineers.

In some circumstances, tests can be executed automatically. With automatic testing, a test engineer must still develop a test plan and a test report. In addition, the engineer develops automated tests. The benefit of such an approach is that tests, particularly those that require multiple instances, can then be executed without manual intervention, with test results stored automatically to result logs, screen dump files, etc.

SUMMARY OF THE INVENTION

Whether tests are executed manually or automatically, several difficulties remain. Although a test summary report may refer to the location of the detailed results, these results can be stored in as many different formats and locations as there are test engineers executing tests. Further, these results are typically not visible to anyone other than the test engineer prior to the completion of the report. These problems make it difficult for anyone to track the testing status of large programs that may span several groups or projects.

The present invention provides a solution to the test-tracking and result visibility problems, and produces a variety of other benefits as well. Generally, the invention comprises a web-based interface to a database for housing and cross-linking test plans, test suites, tests, and test results. A test engineer develops test plans, test suites, and tests using a tester's web interface, and updates the database with test results when tests are executed (this step can be automated). A second web interface, the query interface, allows others to have visibility into the database contents. This interface allows users to query the system based on several attributes and then view or print test plans, suites, tests, and results matching these attributes.

A test information management system according to the invention can be much more than a repository for test results—it allows the integration of test planning, test execution, and results tracking. The tester's web interface can provide guidance to inexperienced testers, showing them the types of things that they should be thinking about when planning and executing tests. It also allows testers to view, emulate, or copy other tester's plans and tests from other projects that may be applicable to a new project, thus encouraging re-use and consistency. Developers can also use the system to reproduce a test failure without lengthy help from the engineer who conducted the test. For managers and other results trackers, the query interface allows them to construct an up-to-date "big picture" of a project, as well as delve into the specifics of a single test by navigating easily comprehendible web hyperlinks. And for employees working with customers, the query interface allows them to identify similar product configurations, how they were tested, what problems were found and how they were fixed, etc.

Visibility into development testing can even be extended to the customers themselves. This aspect of the invention integrates two normally separate organizational functions-product development testing and product support. Customers can browse tests related to their products, observing how the products were configured for testing, what features were tested and the results of those tests, how bugs were resolved, etc. This information can be valuable to customers, and with the present invention, requires almost no extra effort to provide.

In a first aspect of the invention, a centralized test information management system is disclosed. The system comprises a database for storing test plan data, test data, and test result data for multiple products. The system further comprises two web interfaces-a tester's web interface and a query web interface. The tester's web interface presents a navigable collection of templates that allow testers to develop test plans and tests, enter test results, and associate test plans, tests, and test results. Tester input is taken from these templates and stored in the database. The query web interface allows remote users to enter queries and retrieve data matching those queries from the database. The query web interface presents the retrieved data as viewable, and associated, test plans, tests, and test results.

In another aspect of the invention, a method of tracking an ongoing test program is disclosed. This method comprises using a web-based application to gather data elements for a test plan, a test, and test results, and associate the results, the test, and the test plan, the application storing data elements representing the test plan, test, results, and association in a database. The method further comprises using a second web-based application to retrieve data elements from the database in response to a user query and generate a web page for a desired test plan or test using the data elements.

In a third aspect of the invention, a method of supplying product information to customers and/or customer account representatives is disclosed. When a product is tested, the tests and test results are compiled into a searchable database (preferably by the testers themselves during the testing process) keyed to one or more product attributes. A web-based search utility allows users to search the database for test data matching a selected attribute value. The search utility returns the results in a viewable web page.

BRIEF DESCRIPTION OF THE DRAWING

The invention may be best understood by reading the disclosure with reference to the drawing, wherein:

FIGS. 3, 4, 5, 6A, 6B, 7, 8, and 9 illustrate various features of the query interface for an embodiment of the invention; and FIGS. 10, 11, 12, 13A, 13B, 14, 15A, and 15B illustrate various features of the tester's interface for an embodiment of the invention.

DETAILED DESCRIPTION OF THE PREFERRED EMBODIMENTS

Figure 1:
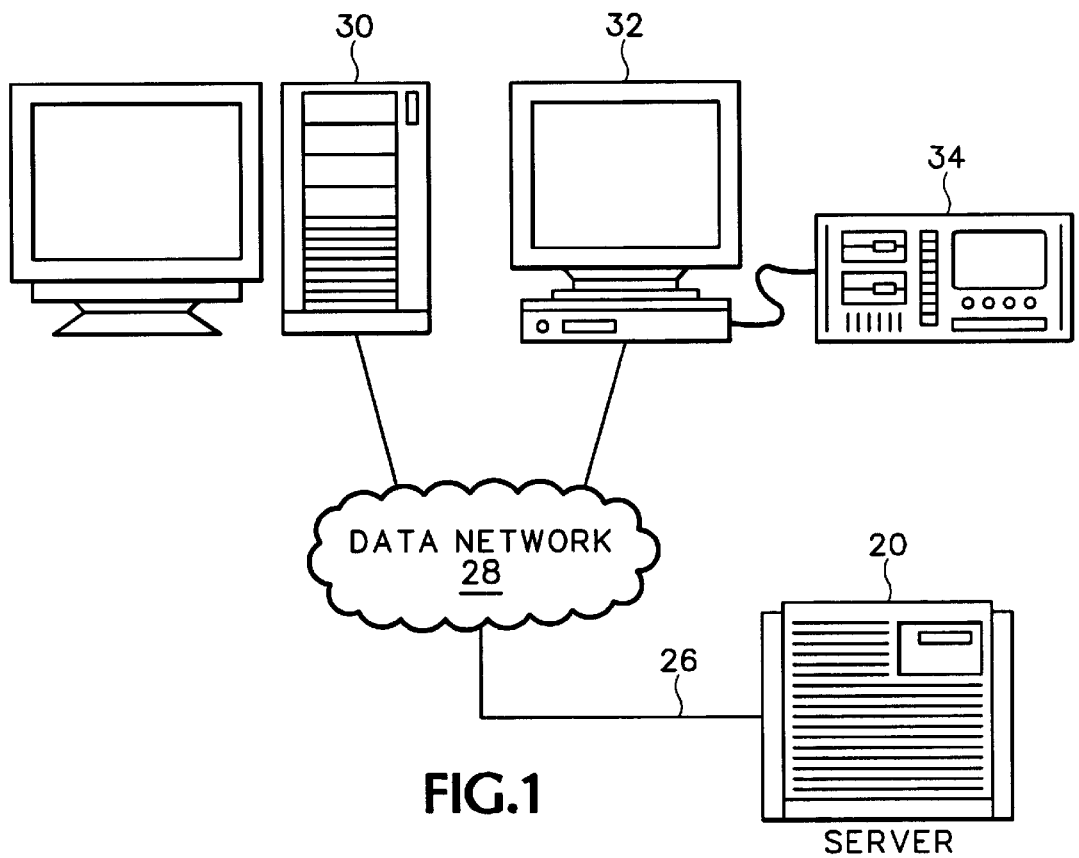
FIG. 1 illustrates an overall hardware configuration for a test information management system according to an embodiment of the invention, and its network connection.

FIG. 1 shows an overall hardware configuration for one embodiment of the invention. Server 20 has a data network connection 26 to data network 28, which may be a local area network or a wide area network. Users access the test application server by running a web browser on a personal computer, workstation, laptop computer, etc. connected to data network 28. For a tester, the computer may be completely separate from any test equipment, like computer 30, or may be interfaced with test equipment, like computer 32 and test equipment 34. In some instances, a single machine may integrate both the test equipment function and the web browser function.

Figure 2:
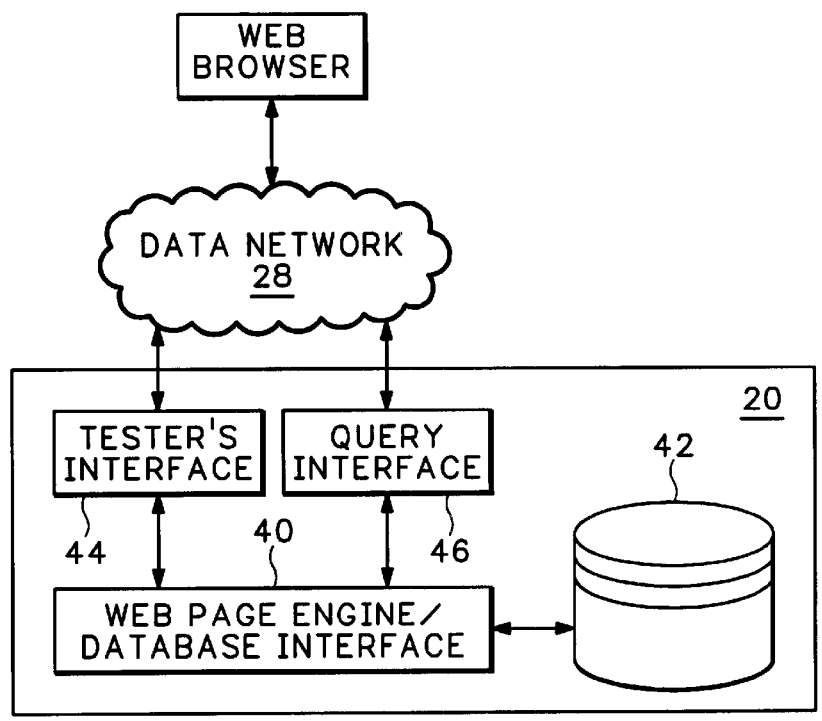
FIG. 2 shows an overall logical configuration for a test information management system according to an embodiment of the invention.

FIG. 2 shows the logical configuration of server 20. A database 42 stores test information and system information. Two interfaces to system 20 are provided to receive input from and supply output to network web browser users. Query interface 46 allows a user to retrieve data from database 42, but does not allow data to be changed. Tester's interface 44 preferably requires that a user have an account and password, since interface 44 allows test information to be entered and modified in database 42. Both interface 44 and interface 46 connect to database 42 through web page engine/database interface 40. Web page engine/database interface 40 performs database queries for interfaces 44 and 46, and generates viewable web pages for transmission to users.

Each of these interfaces can be implemented using well-understood techniques. For example, web page engine/database interface 40 can utilize PERL (Practical Extraction and Report Language) scripts to fill HTML (Hypertext Markup Language) templates to create web pages for display. The PERL scripts issue SQL (Structured Query Language) commands to database 42 for test information storage and retrieval. Likewise, information entered by users on their displayed web pages can be parsed by PERL scripts and used to select HTML templates for new web pages, as well as to fill these templates. Detailed scripting may also be avoided using a tool such as Cold Fusion™ that uses predeveloped CGI (Common Gateway Interface) scripts.

Tests, plans, etc. are stored as text records in database 42. The system also allows illustrations and figures to be uploaded, associated with a test, and stored in the database, e.g., in GIF (Graphics Interchange Format) or PDF (Portable Document Format).

Figure 3:
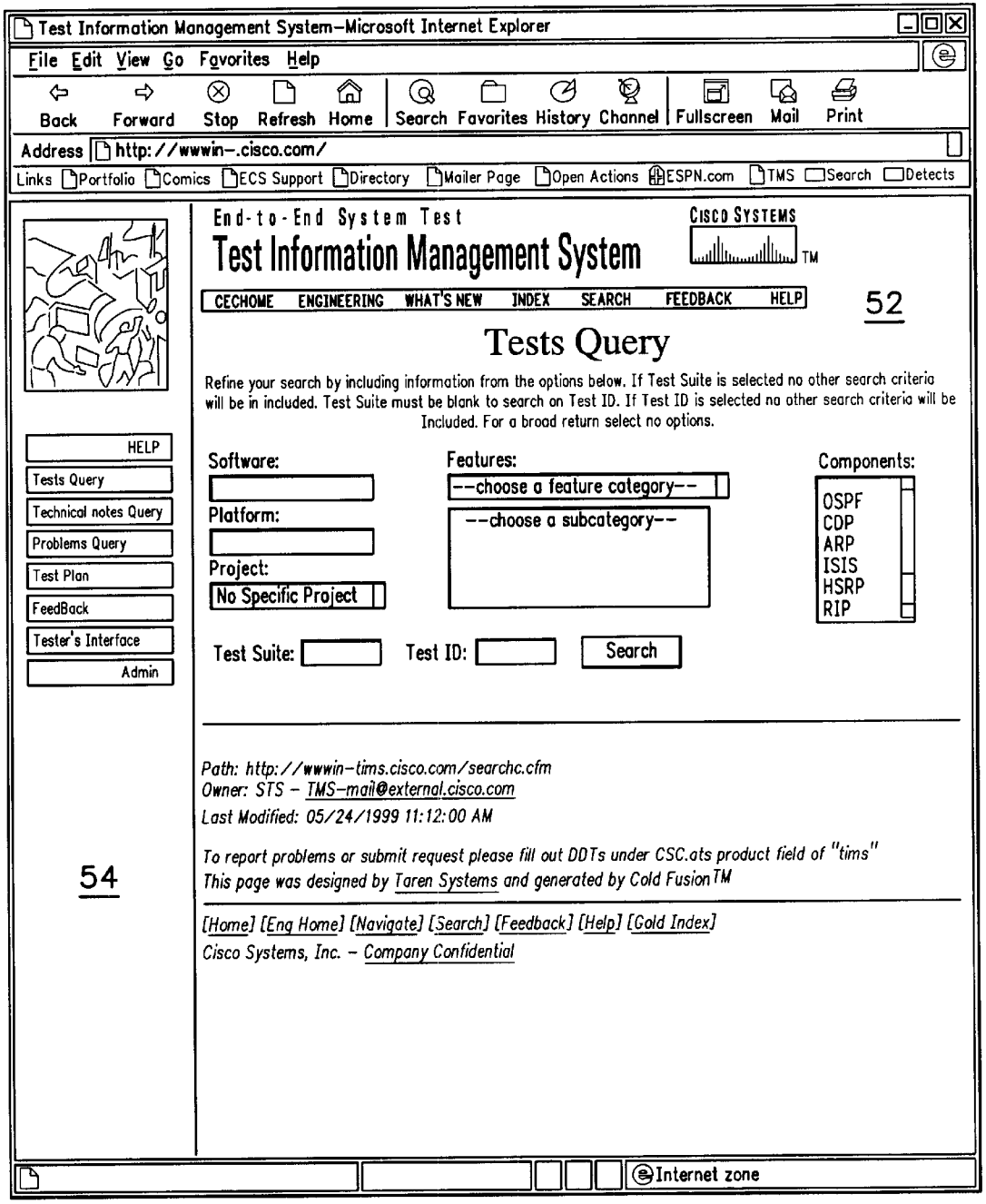

Operation of the system can be best understood with reference to actual web output created by an embodiment of the system under a variety of conditions. Referring first to FIG. 3, a "home" page is displayed for an embodiment of the invention named the Test Information Management System (TIMS). This home page comprises several frames, including tests query frame 52 and page selector frame 54. Page selector frame 54 provides selection "buttons" for accessing other system features, including queries that focus only on technical notes or problems or test plans, and for accessing the tester's interface. Tests query frame 52 contains the main query web interface for the system. Frame 52 allows a user to select a value for one or more of several attributes for query. These attributes can include a software version number, a specific platform (e.g., the product model number of a router product), a project (e.g., an association of tests representing one or several development projects), features (e.g., specific ATM or IP functionality), or a software component (e.g., a code subset that implements a specific protocol). Alternately, if a user knows the identifier for a specific test or suite of tests, these can be entered.

Figure 4:
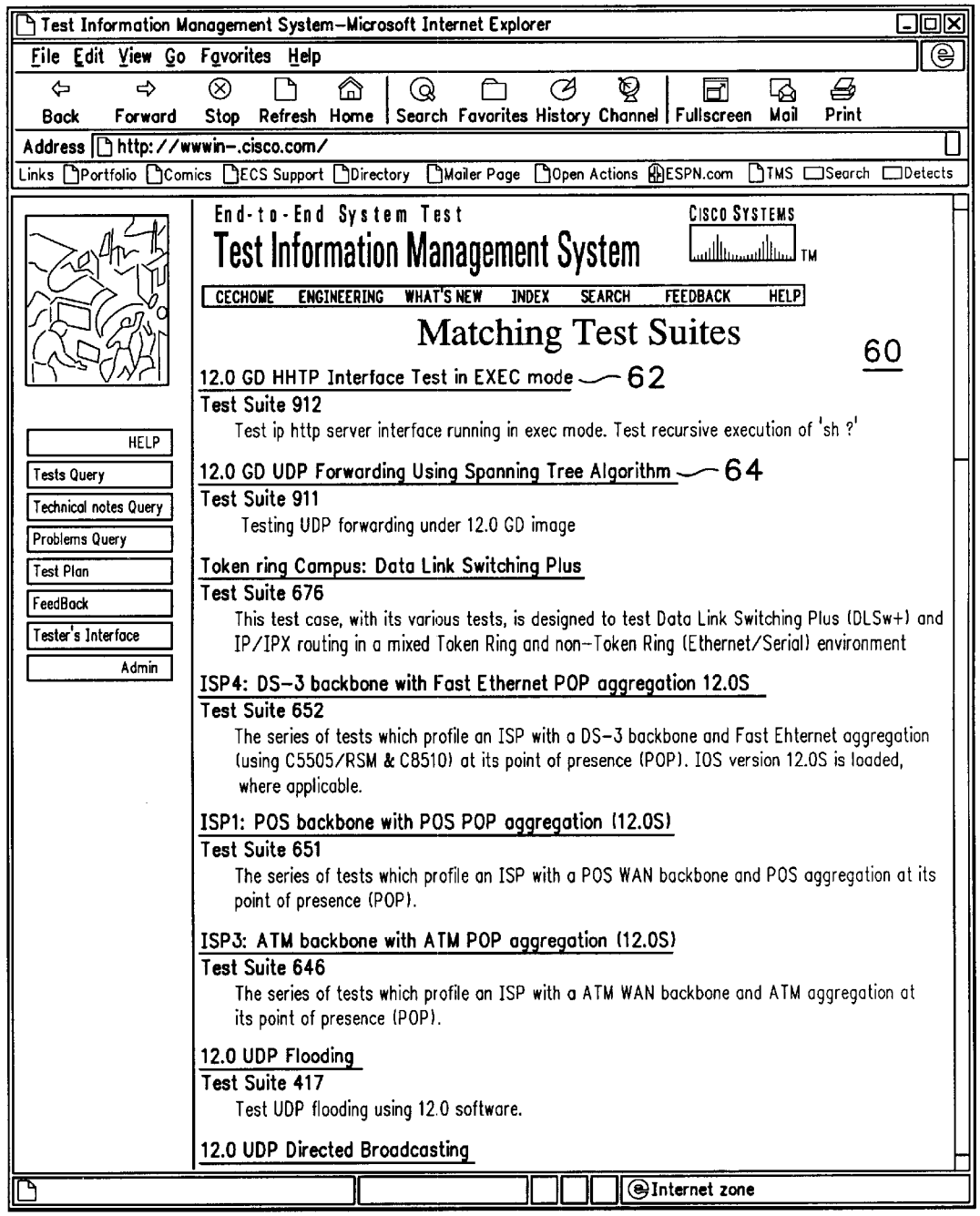

FIG. 4 illustrates the results of a query, entered using the query frame 52 of FIG. 3, requesting information on testing for software version 12.0. The results shown in frame 60 display matching test suites by title and test suite number, and include a brief description for each test suite in the list. Note that test suite titles (e.g., titles 62 and 64) appear in frame 60 as hyperlinks that can be selected by a user to obtain detailed information on a test suite.

Figure 5:
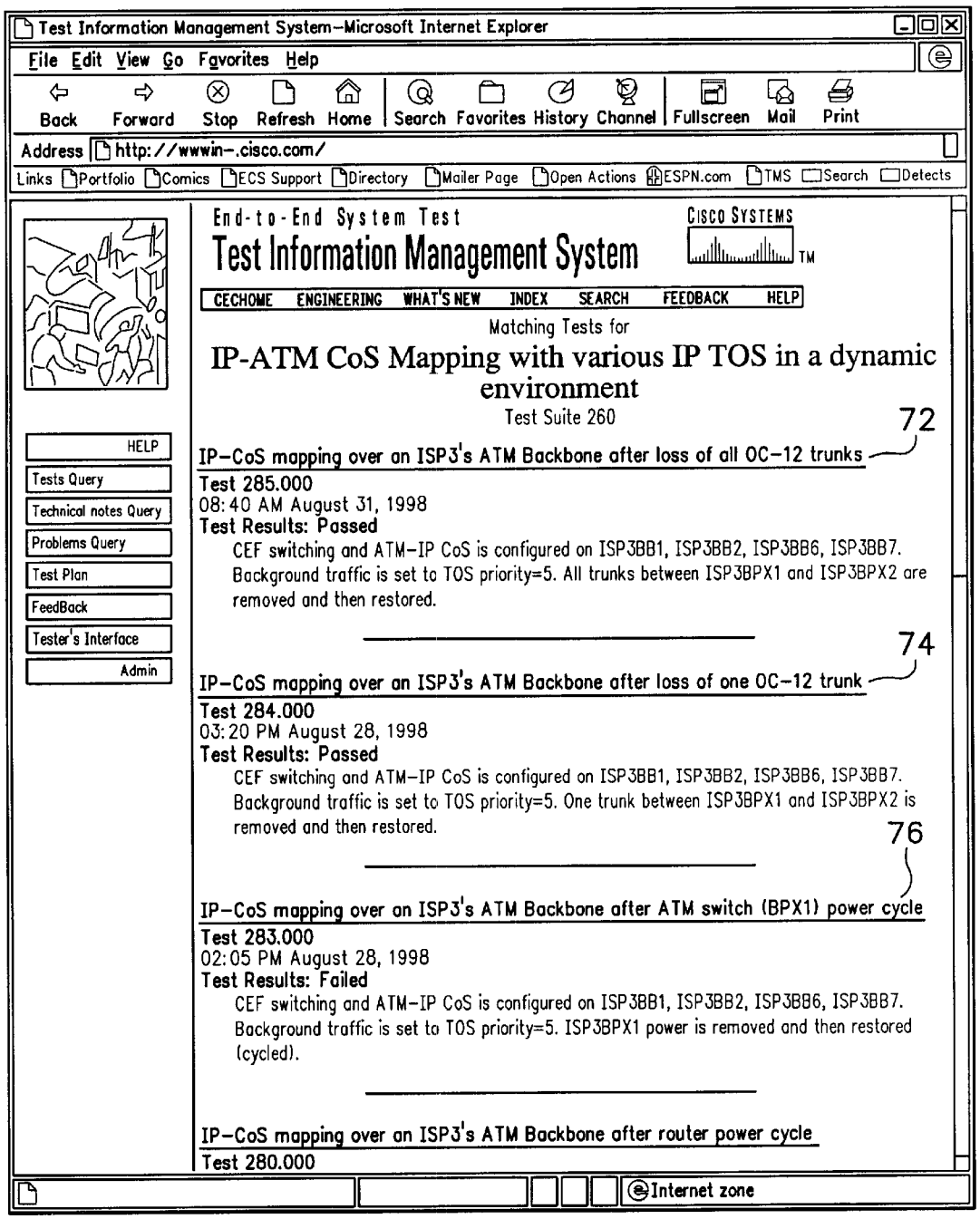

FIG. 5 shows detailed information for test suite 260. This information was displayed in response to a user selecting the linked test suite title for suite 260, and is displayed in a list summary format much like that of FIG. 4, except it displays tests instead of test suites. This summary displays test titles (e.g., 72, 74, 76) as links to complete test results. It also displays test number, test date, whether the test passed or failed, and a brief description for each test in the test suite.

Figure 6A:
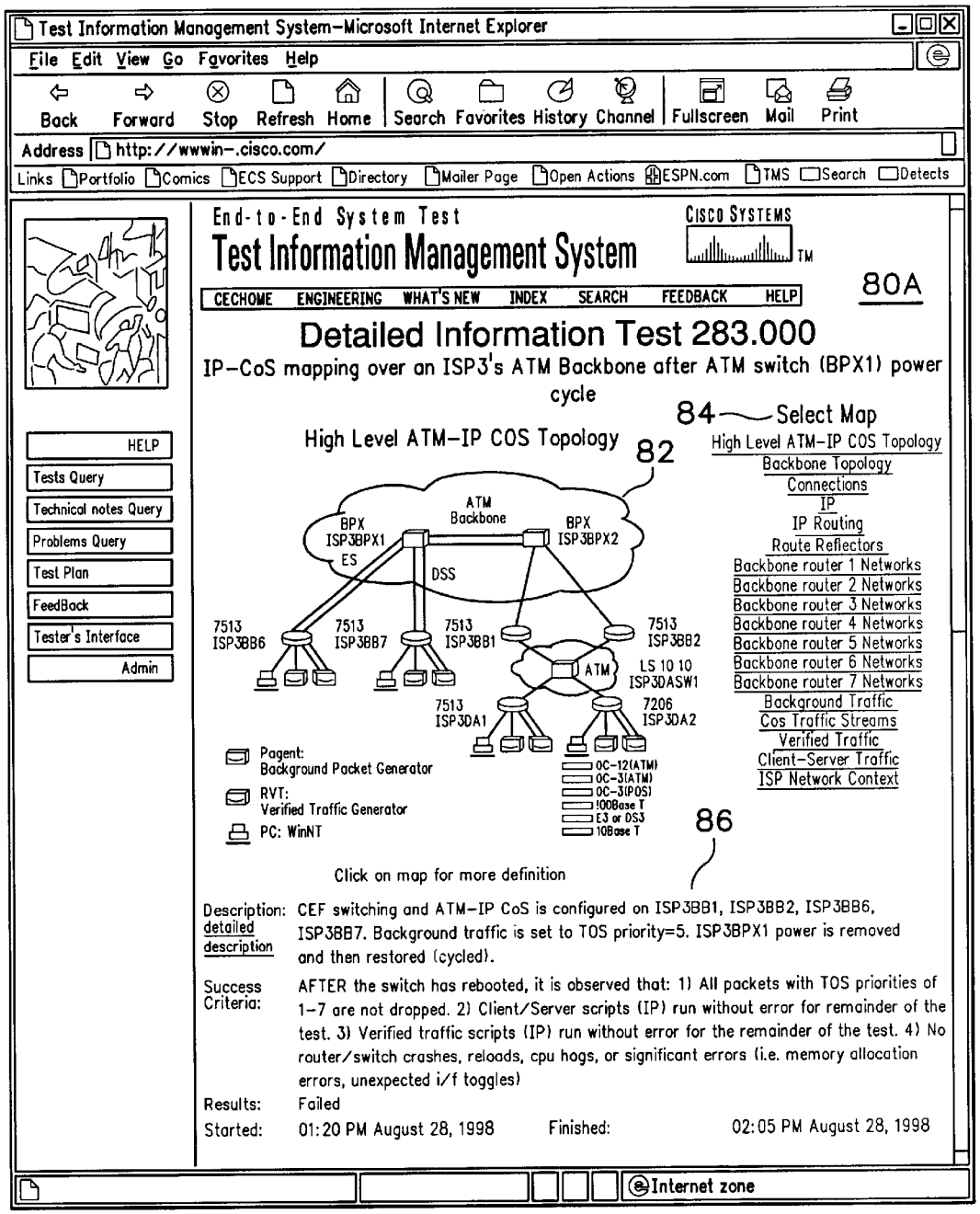

FIGS. 6A and 6B illustrate detailed test information that is displayed to a user in response to them selecting linked test title 76 in FIG. 5. FIG. 6A contains an illustration of the network configuration used for the test (map 82), and contains links 84 to other relevant maps for the test. At the bottom of FIG. 6A, text section 86 explains the test in detail.

Figure 7:
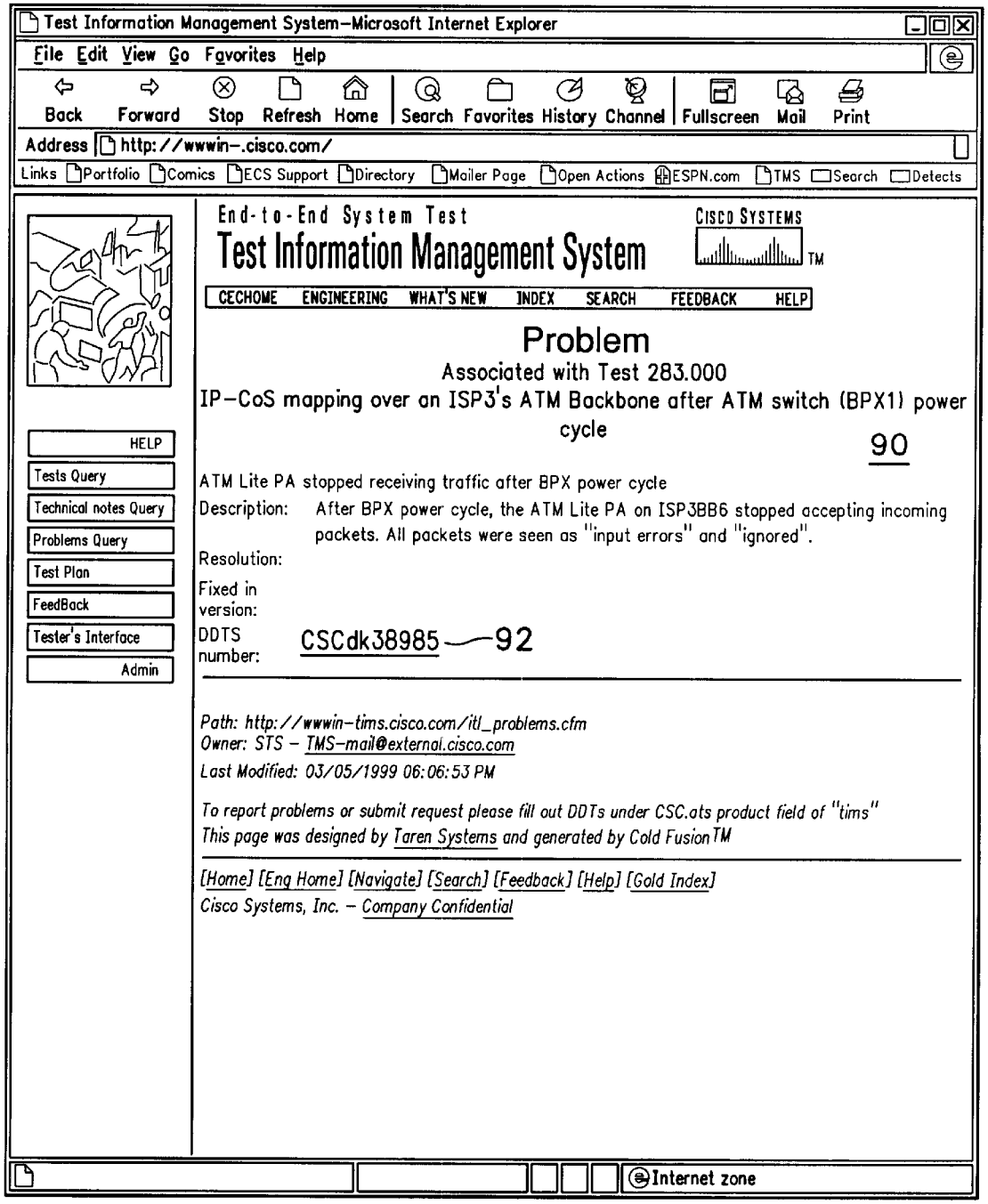
Figure 9:
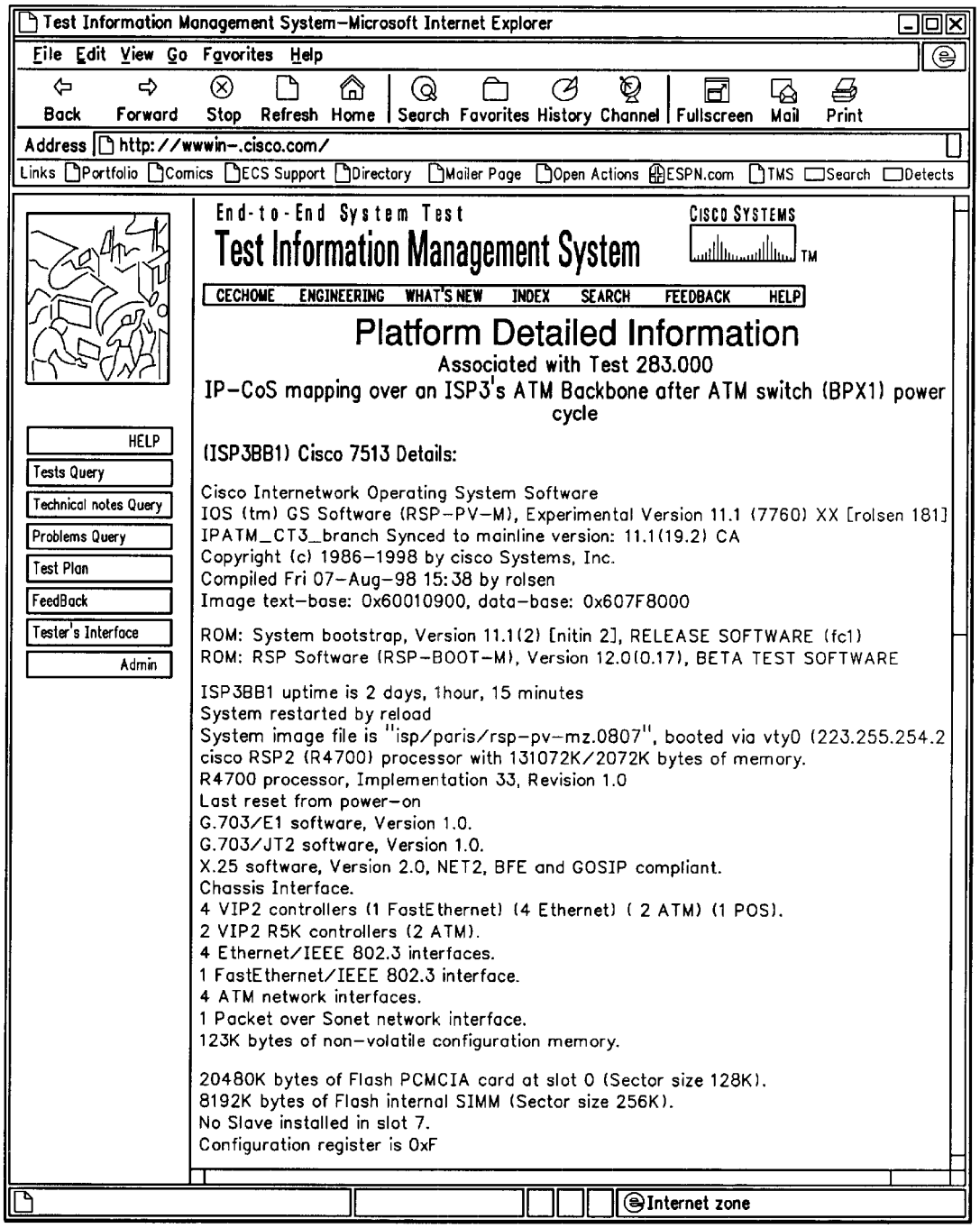

Link section 88 (bottom half of FIG. 6B) allows users to view even more detailed information about specific aspects of the test. For instance, a user selecting the "Problems" link will be supplied with the information of FIG. 7. And by selecting DDTs (Device Defect Tracking System) link 92 ("CSCdk38985") on either FIG. 6B or FIG. 7, the user is taken to a defect description related to the problem (shown on FIG. 8). Also, FIG. 9 shows sample results for a user selecting, on FIG. 6B, the Platform Details link "(ISP3BB1) Cisco 7513". This link shows platform configuration details for one of the routers used in this particular test.

From FIGS. 3–9, it can be appreciated that the described embodiment allows query users to quickly explore ongoing and completed testing. Because of the standardized format and the hyperlinks provided for navigating between levels of detail, this embodiment allows users to easily focus on a desired breadth or depth of testing information.

The second major part of TIMS, the Tester's Interface, is illustrated in FIGS. 10–15B. The Tester's Interface provides templates that allow testers to enter testing data into the database and indicate the proper data associations for the test. The Tester's Interface also provides guidance to novice testers, as well as access to data already in the database for reference or duplication.

Figure 10:
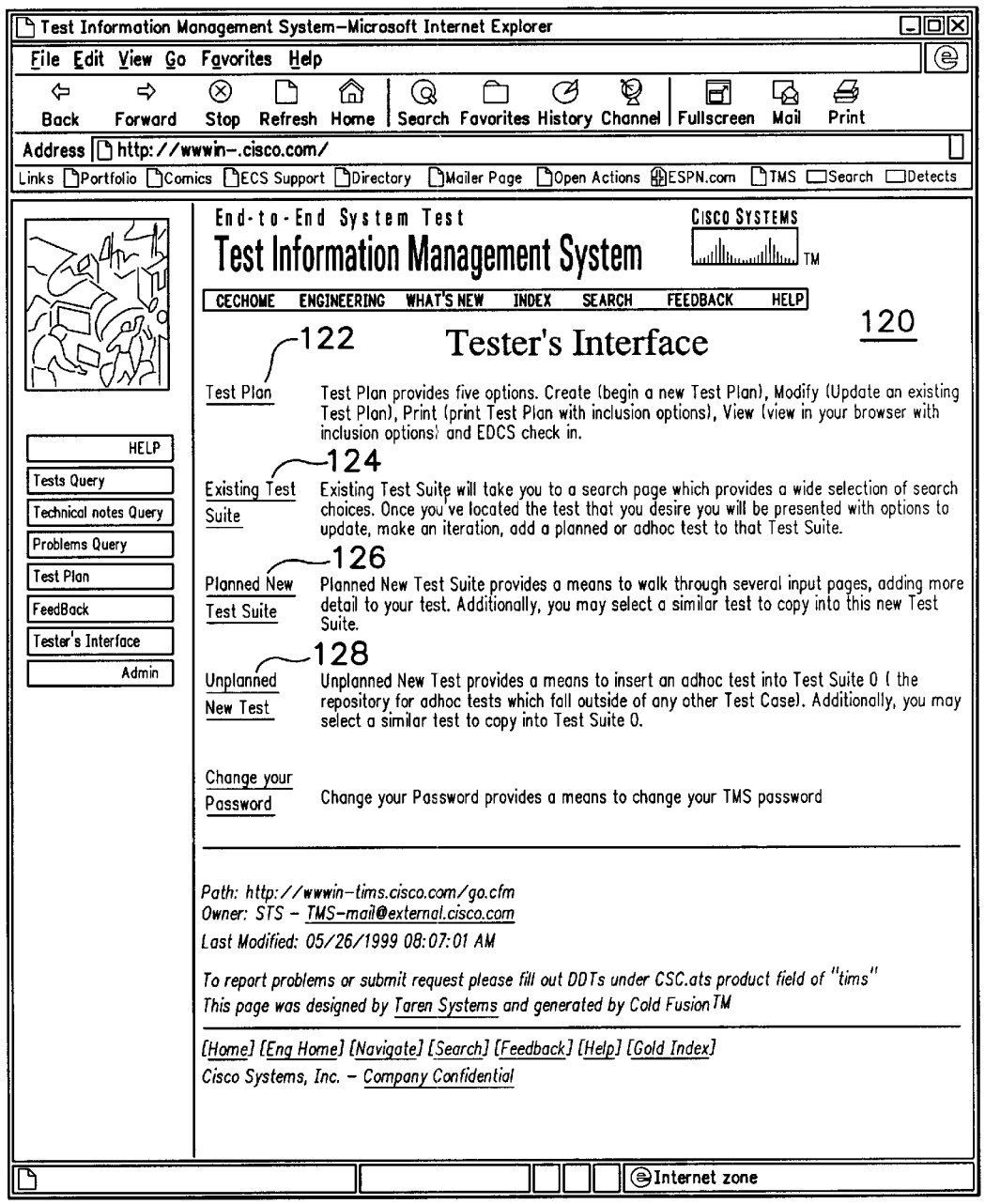

FIG. 10 shows the main page of the Tester's Interface in frame 120. Since the Tester's Interface allows database information to be modified, access to this page requires an account and password. Once in the interface, a tester can work with a test plan by selecting link 122, work with one of their existing test suites by selecting link 124, initiate a new test suite by selecting link 126, or create a stand-alone test by selecting link 128.

Figure 11:
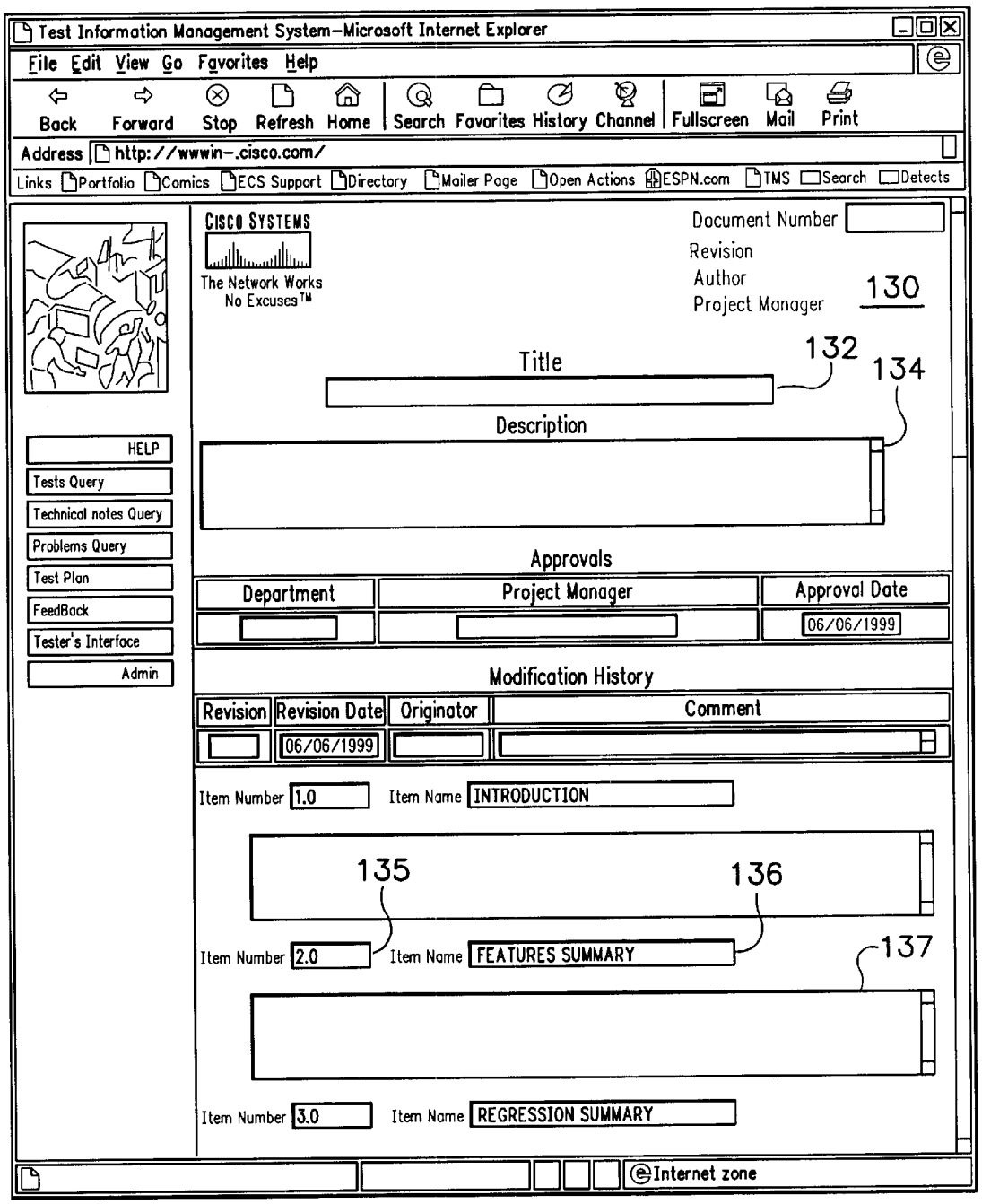

FIG. 11 shows the template displayed when a tester selects link 122 and initiates a new test plan. The template provides a number of fields that the tester can use to build a test plan. Title field 132 and short description field 134 provide basic information about the test plan that will be displayed to users initiating high-level queries. A variety of fields are also provided to allow the tester to build the bulk of an organized document. In this example, a large number of field groups similar to group 135, 136, 137 are provided. The tester may type the plan directly into these fields, or cut and paste text from other sources. Some of these field groups have suggested numbering and titles already provided to guide the user, such as the numbering and title shown in fields 135 and 136. In addition to those titles shown, other possible section titles that could be used to prompt the user include titles such as "Approach", "Testing Pass/Fail Criteria", "Suspension Criteria", "Environmental Requirements", "Risks and Contingencies", "Documentation", "Bug Reporting", and "References".

Figure 12:
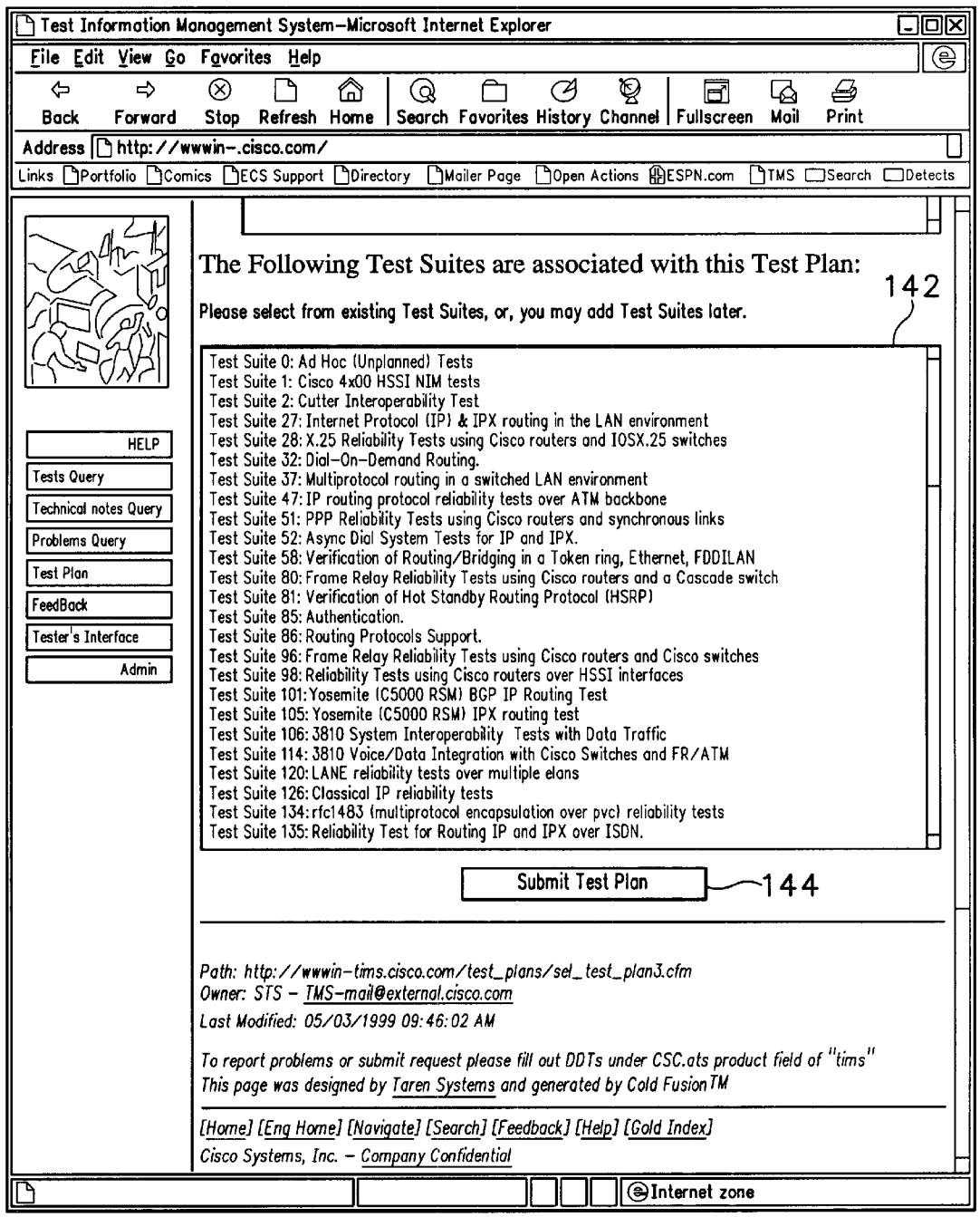

FIG. 12 shows a second area of the test plan template. Selection block 142 shows test suites that exist in the system. A tester may select one or more of the test suites shown in block 142 for association with the test plan. Finally, button 144 is used to submit the test plan to the database. When the tester selects button 144, their field entries and test suite associations are parsed into the database to create the new test plan.

Figure 13A:
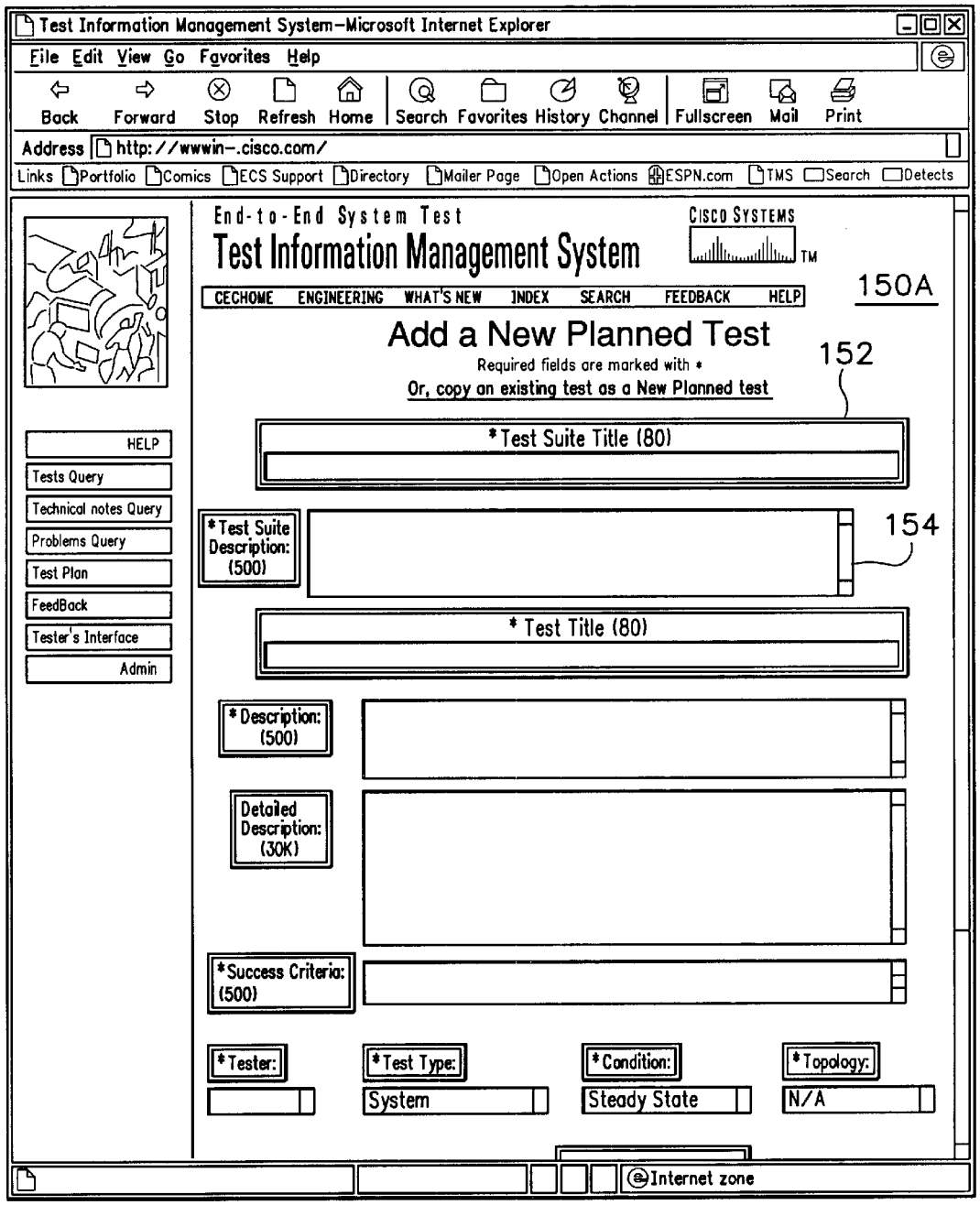
Figure 13B:
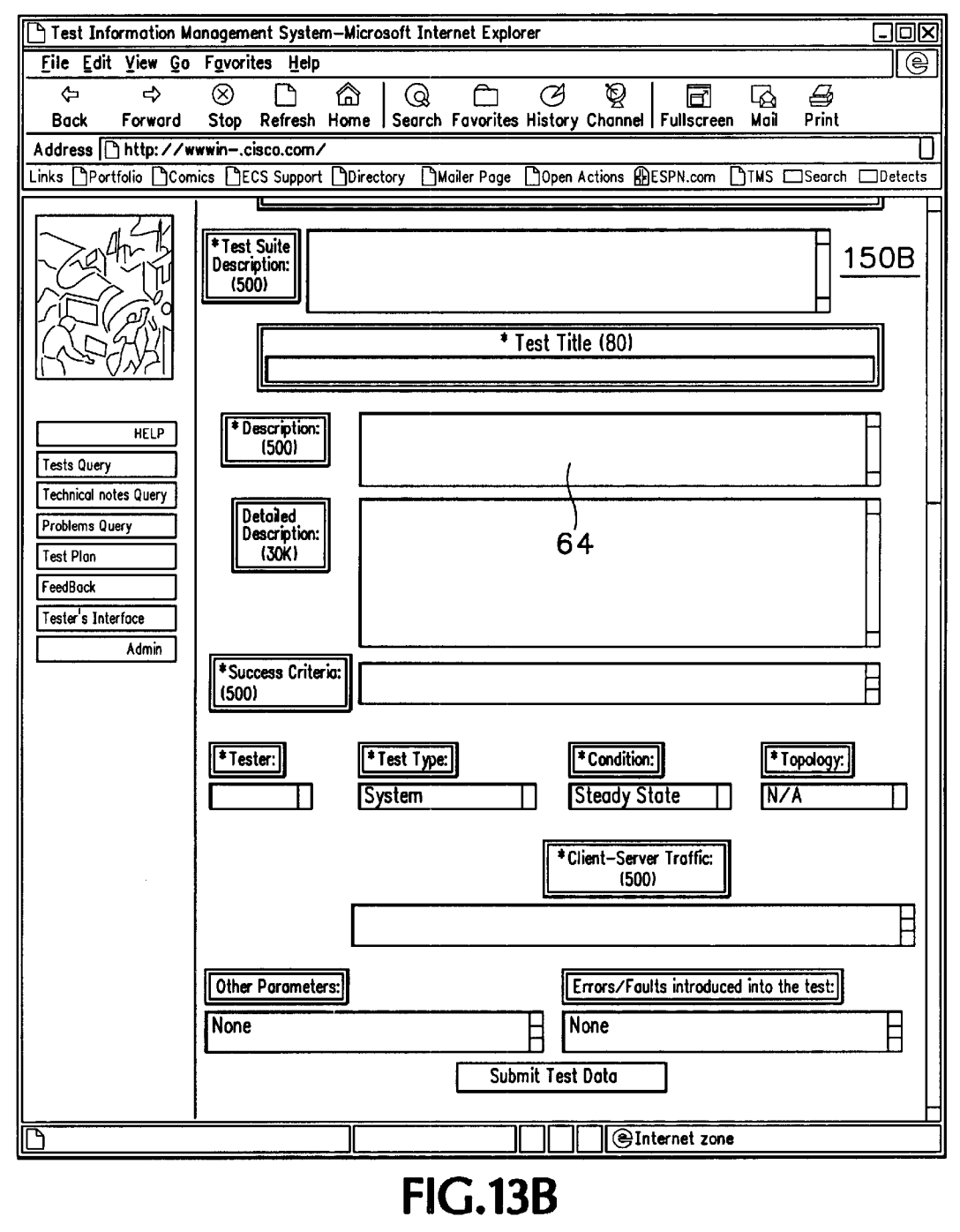
Figure 14:
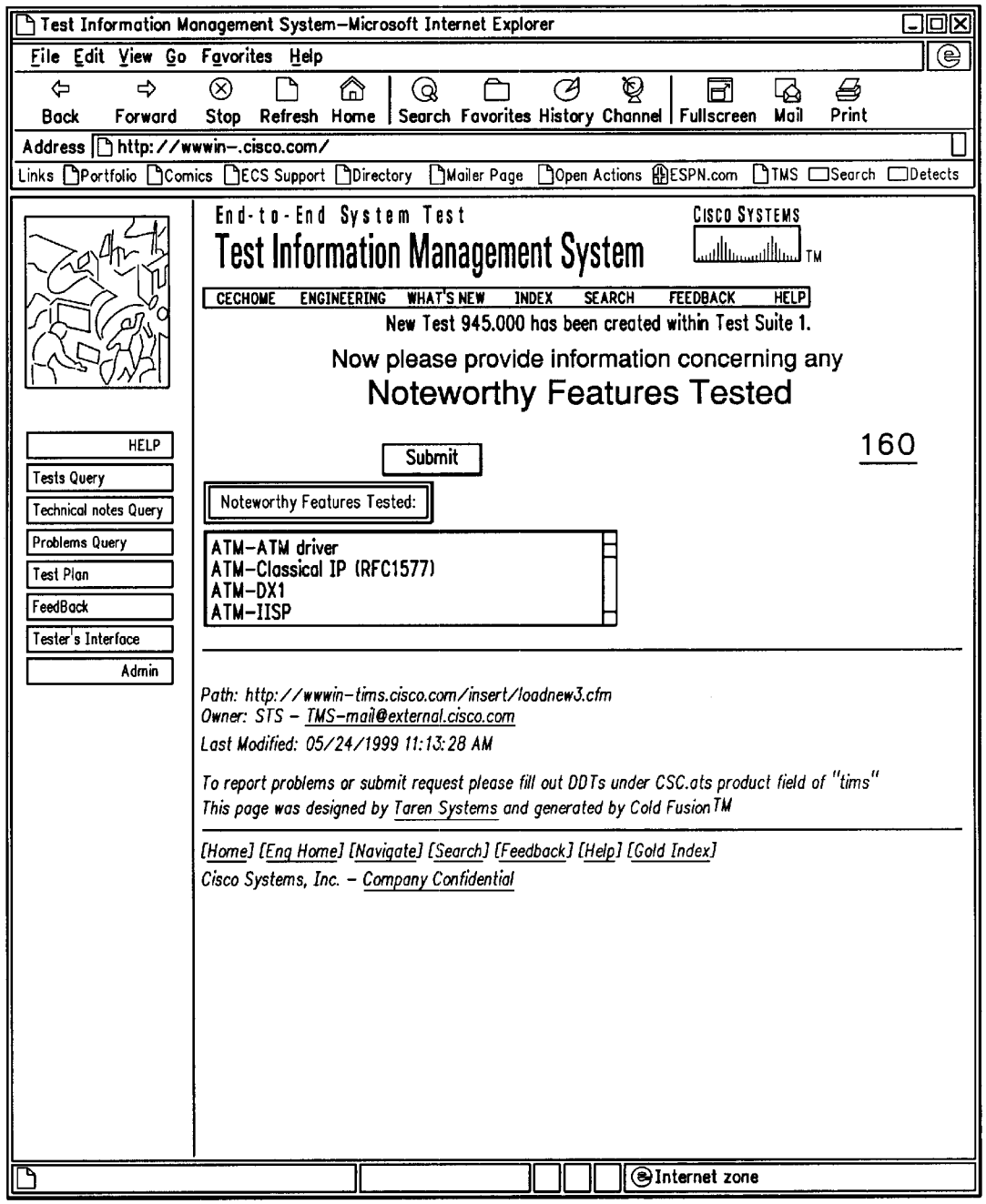

FIGS. 13A and 13B show sections 150A, 150B of a template that can be used to add a test suite (and a test within that suite) to the system. Test suite title field 152 and test suite description field 154 describe the suite. The remainder of the fields in sections 150A and 150B are used to document a new test that is associated with the test suite.

Once the basic information for a test has been entered (using template 150A, 150B, or a similar template (not shown) for adding a test to an existing test suite), a tester is prompted to add further details and associations for the test. For example, frame 160 of FIG. 14 allows the tester to indicate noteworthy features tested. When submitted, these features will be associated with the test in the database. Although not shown, the tester is also asked on succeeding pages to provide information about platform details, test tools, and maps (images) that should be uploaded and included.

Figure 15A:
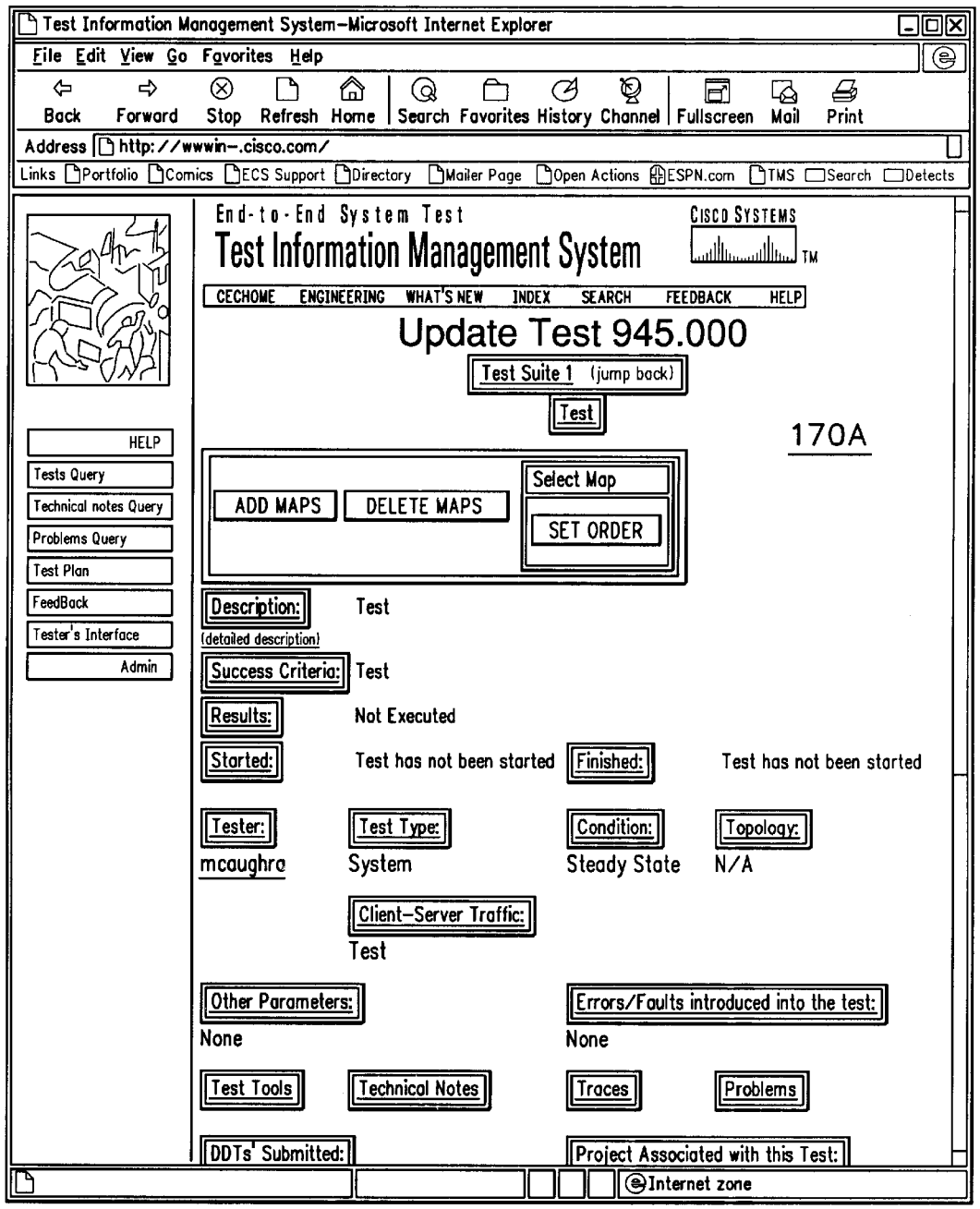
Figure 15B:
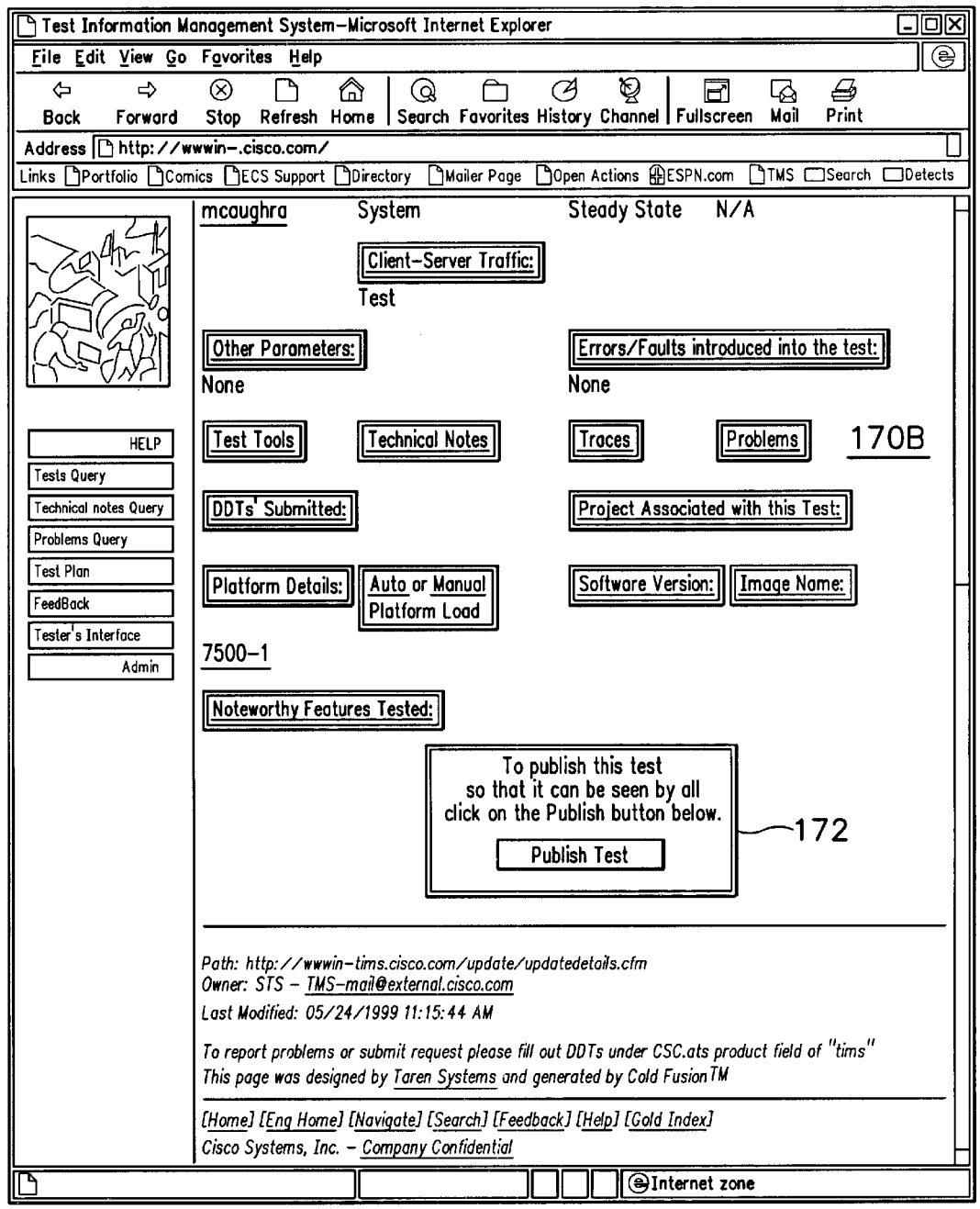

The test can later be updated using a test update web page, shown in FIGS. 15A and 15B as frame sections 170A and 170B. The test update web page provides links to areas of the test that can be updated or revised, and will modify the corresponding database entries when used by a tester having modify privileges for that test. Button 172 is used to control the publication attribute of the test. When a test is first created, its publication attribute is set to "Unpublished"—this value provides test visibility only to authorized testers. When a tester changes the attribute to "Published", the test becomes visible to everyone with access to the network that houses TIMS. Finally, a tester can change the attribute to "Complete", locking the test to prevent further modification.

An additional publication attribute for "Published" and "Complete" tests can be used to further delineate visibility. For example, the attribute "Engineering Only" can be used to limit access to those on the engineering network. A "Company Confidential" attribute can expand access to those on the company's private network, thus allowing account teams and customer service personnel to view test results so marked. Finally, some tests can be marked for viewing without restriction, thus allowing customers to access test data. An attribute such as "Customer Viewable" can be used to indicate tests that are viewable by all.

In order to implement different levels of viewability, different query interfaces 46 can be provided on each network. For instance, the pages displayed on an externally-available network would not include selection buttons for "Tester's Interface", or links to inaccessible data. Also, the externally-available network server can access (e.g., over a connection to the private network) the same database 42 and database interface 40 that the internal network server accesses. The externally-available network server simply adds a field to all queries that it sends to the database, to limit search results to "Customer Viewable" test information.

The test information management system described above has many advantages for an organization. One of the advantages of the present invention is that it allows platform-independent test data collection by a large number of testers to be centrally administered in a large, widespread organization. This creates uniformity across the organization, removes inefficiencies found in duplication of efforts, and enhances communication. Software updates and data back-ups are also confined to a central location and instance, instead of being spread across multiple testing groups and testers. The familiar web-browser interface allows new users to access the system without specialized training.

For those performing tests, the online interface provides a tool for developing test plans, test suites, and tests. Once the test framework has been entered, the test engineer has built an interface that allows them to input test results real-time. And when testing is completed, all of the results are already stored with test information, so there is no need to compile and organize results and write a report-the report already exists online. If the test environment needs to be recreated, e.g., by a developer trying to recreate a problem, it can be done without relying on the engineer or his memory, as all the information necessary is in the test details online.

Test managers also benefit from the system. They can view results real-time without having to approach each of their engineers to obtain status information. The system's reporting capability also allows the information to be viewed in many different ways, with almost any type of view being possible.

Likewise, program managers can check status on multiple test efforts that affect their program, without having to use multiple resources (such as their test managers) to get answers. The system allows them to view status in a standard format and to obtain it whenever they need it.

For those working with customers, or customers themselves, the system allows them to see what has been tested. For instance, if a customer site has a malfunction, the test database can be used to rule out certain problems, allowing efforts to be focused on things that have not been tested before product release. Also, the configuration implementation in the successful tests provides a path that customers can emulate. By implementing a feature or platform in a way similar to the way it was tested, a customer is much less likely to encounter problems that were not discovered in testing. These advantages allow customers to gain insight from a knowledge source that traditionally has been closed to them—a product's development testing program and results.

After reading this disclosure, one of ordinary skill in the art will recognize that many minor modifications to the disclosed embodiments are enabled by the concepts taught herein. For example, the test plan/test suite/test hierarchy can be easily modified to include a greater or lesser number of levels to suit a given organization's needs, as can templates, fields, and association strategies. HTML, PERL, SQL, CGI, and Cold Fusion™ are exemplary of the tools that can be used in a given system implementation-many other tools can be employed to achieve similar results. Other modifications to the disclosed embodiments will be obvious to those of ordinary skill in the art upon reading this disclosure, and are intended to fall within the scope of the invention as claimed.

What is claimed is:

1. A centralized test information management system comprising:
    a database for storing test plan data, test data, and test result data for multiple products;
    a tester's web interface presenting a navigable collection of web-browser viewable templates that allow testers to construct test plans and tests, enter test results, and associate the test plans, tests, and test results together into test suites that are automatically formatted by the tester's web interface for accessing through a web page engine; and
    a query web interface where remote users enter queries through the web page engine that retrieve the test suites matching those queries from the database, the query web interface presenting the retrieved test suites as web-browser viewable overviews of the associated test plans, test, and test results.

2. The centralized test information management system of claim 1, wherein the database and the web interfaces reside on a common server.

3. The centralized test information management system of claim 1, wherein at least one web interface resides on a first server and the database resides on a second server.

4. A centralized test information management system comprising:
    a database for storing test plan data, test data, and test result data for multiple products;
    a tester's web interface presenting a navigable collection of web-browser viewable templates that allow testers to construct test plans and tests, enter test results, and associate test plans, tests, and test results, the interface storing tester data and associations into the database; and
    a query web interface that allows remote users to enter queries and retrieve data matching those queries from the database, the interface presenting the retrieved data as web-browser viewable and associated test plans, tests, and test results, wherein the tester's web interface allows tester input to be classified to one of multiple levels of visibility, and wherein the query web interface uses the visibility level of a remote user to filter the data matching the user's query and present only the data matching the user's visibility level to the user.

5. The centralized test information management system of claim 4, wherein the query web interface comprises at least two separate interfaces, each applicable to different visibility levels.

6. The centralized test information management system of claim 5, wherein one of the two separate interfaces is accessible via a public network connection.

7. The centralized test information management system of claim 1, wherein in the web-browser viewable test plans, tests, and test results, an association between a test plan and its associated tests is accessible by means of one or more hyperlinks on the web-browser viewable test plan.

8. The centralized test information management system of claim 1, wherein in the web-browser viewable test plans, tests, and test results, an association between a test and its associated test results is accessible by means of one or more hyperlinks on the web-browser viewable test.

9. A method of providing a tracking function for an ongoing test program, the method comprising the steps of:
    presenting a web-based tester interface that constructs test plans and tests, enters test results, and associates the results, test, and the test plan together while automatically formatting the associated results, test and test plan together into test suits that are searchable and viewable through a web browser;
    storing test data representing the test plans, tests, results, and association, supplied by testers via the tester interface, in a database; and
    providing a query interface that displays through the web browser an overview of the results, test, and test plan for test suites of specified test data from the database in response to a query.

10. The method of claim 9, wherein the query interface step of formatting retrieved data includes the step of including on the viewable web page a hyperlink to a second viewable web page showing associated data of greater or lesser detail than the retrieved data.

11. The method of claim 9, wherein the web-based tester interface provides a mechanism for a tester to upload an image to the database for inclusion in test data.

12. The method of claim 9, further comprising the steps of providing an option to query interface users for printing specified test data, and responding to requests for that option by formatting the retrieved data in a printable format.

13. The method of claim 9, further comprising the steps of providing an option for submission of a viewable web page and/or printable format output to a revision control system.

14. A method of supplying product information to customers and/or customer account representatives, the method comprising the steps of:
    providing templates used for entering test and test results during development testing of a product by a testing group;
    automatically compiling the tests and test results entered through the templates into a searchable database of test suites keyed to different product attributes including tests and test results; and
    providing visibility into this database from a web-based search utility that allows a user outside of the testing group to search the database for test data matching the different product attributes, the search utility returning results and overviews of the different product attributes in a viewable web page.

15. The method of claim 14, further comprising the step of providing, in the results returned in a viewable web page, a hyperlink to more detailed results associated with the returned results.

16. The method of claim 14, wherein the database is simultaneously available for development testing use by the testing group and for search use by users outside of the testing group.

17. A method of supplying product information to customers and/or customer account representatives, the method comprising the steps of:
    during development testing of a product by a testing group, compiling tests and test results into a searchable database of test data keyed to one or more product attributes;
    providing visibility into this database from a web-based search utility that allows a user outside of the testing group to search the database for test data matching a selected attribute value, the search utility returning results in a viewable web page;

wherein the database is simultaneously available for development testing use by the testing group and for search use by users outside of the testing group; and wherein elements of test data are stored in the database with an associated visibility level, selected from a first visibility level that limits visibility to the testing group and a second visibility level that extends visibility to others outside of the testing group.

18. A computer-readable medium containing a program for accessing a test information database, the program comprising:

a database interface for storing test information to and retrieving test information from a database;

a web page engine that receives retrieved test information from the database interface and constructs viewable web pages based on the retrieved information;

a tester's web interface that allows testers to navigate a collection of web-browser viewable templates in order to construct and enter test plans, tests, and test results, the templates assigning categories to the test plans, tests, and test results and associating the test plans, tests and test results with test suites according to the assigned categories, the tester's web interface supplying tester-entered data to the database interface for storage; and a query web interface that parses query data entered by remote users on web forms, and requests that the database interface and web page engine generate a viewable web page containing and displaying overviews of the test plans, tests and test results for the test suites identified in query results from the database.

19. The computer readable medium of claim 18, further providing, in the results returned in a viewable web page, a hyperlink to more detailed results associated with the query results.

20. The computer readable medium of claim 18 wherein the database is simultaneously available for development testing use by a testing group and for search use by users outside of the testing group, the users outside the testing group being prevented from changing the test plans, tests and test results.

21. The computer readable medium of claim 18 wherein elements of test plans, tests, and test results are stored in the database with an associated visibility level, selected from a first visibility level that limits visibility to the testing group and a second visibility level that extends visibility to others outside of the testing group.

22. A system for supplying product information to customers and/or customer account representatives, the system comprising:

means for providing templates used for entering test and test results during development testing of a product by a testing group;

means for automatically compiling the tests and test results entered through the templates into a searchable database of test suites keyed to different product attributes including tests and test results; and means for providing visibility into the database from a web-based search utility that allows a user outside of the testing group to search the database for test data matching the different product attributes, the search utility displaying results and overviews of the different product attributes from a viewable web page.

23. The system of claim 22 further comprising means for providing, in the results and overviews returned in a viewable web page, a hyperlink to more detailed results associated with the returned results.

24. The system of claim 22 including means for making the database simultaneously available for development testing use by the testing group and for search use by users outside of the testing group; the users outside the testing group being prevented from changing the tests and test results.

25. The system of claim 22 including means for storing elements of test data in the database with an associated visibility level and selecting from a first visibility level that limits visibility to the testing group and a second visibility level that extends visibility to others outside of the testing group.

* * * * *